No. 873,877. PATENTED DEC. 17, 1907.
H. W. LOUDEN, Sr.
SAUSAGE LINKING AND TWISTING MACHINE.
APPLICATION FILED MAR. 20, 1907.

3 SHEETS—SHEET 1.

No. 873,877. PATENTED DEC. 17, 1907.
H. W. LOUDEN, Sr.
SAUSAGE LINKING AND TWISTING MACHINE.
APPLICATION FILED MAR. 20, 1907.

3 SHEETS—SHEET 2

Witnesses

Inventor

No. 873,877. PATENTED DEC. 17, 1907.
H. W. LOUDEN, Sr.
SAUSAGE LINKING AND TWISTING MACHINE.
APPLICATION FILED MAR. 20, 1907.
3 SHEETS—SHEET 3.
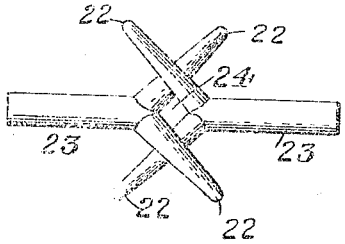
Fig. 3.
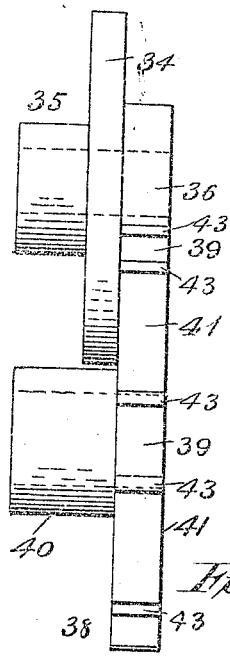
Fig. 4.
Fig. 5.

UNITED STATES PATENT OFFICE.

HENRY W. LOUDEN, SR., OF LEBANON, PENNSYLVANIA.

SAUSAGE LINKING AND TWISTING MACHINE.

No. 873,877.  Specification of Letters Patent.  Patented Dec. 17, 1907.

Application filed March 20, 1907. Serial No. 363,432.

*To all whom it may concern:*

Be it known that I, HENRY W. LOUDEN, Sr., a citizen of the United States, residing at Lebanon, in the county of Lebanon and State of Pennsylvania, have invented certain new and useful Improvements in Sausage Linking and Twisting Machines; and I do hereby declare the following to be a full, clear, and exact description of the invention, such as will enable others skilled in the art to which it appertains to make and use the same.

My invention relates to the manufacture of sausages, has for its object a machine for dividing filled sausage-casings into links or sections of a predetermined length, and then twisting the part of the casing between the links to cause them to permanently retain their divided or link form.

The invention has for its object economy in time and labor, and the production of sausage links of uniform length, and the invention consists in certain novel features of construction which will be fully disclosed in the following specification and claims.

Figure 1:
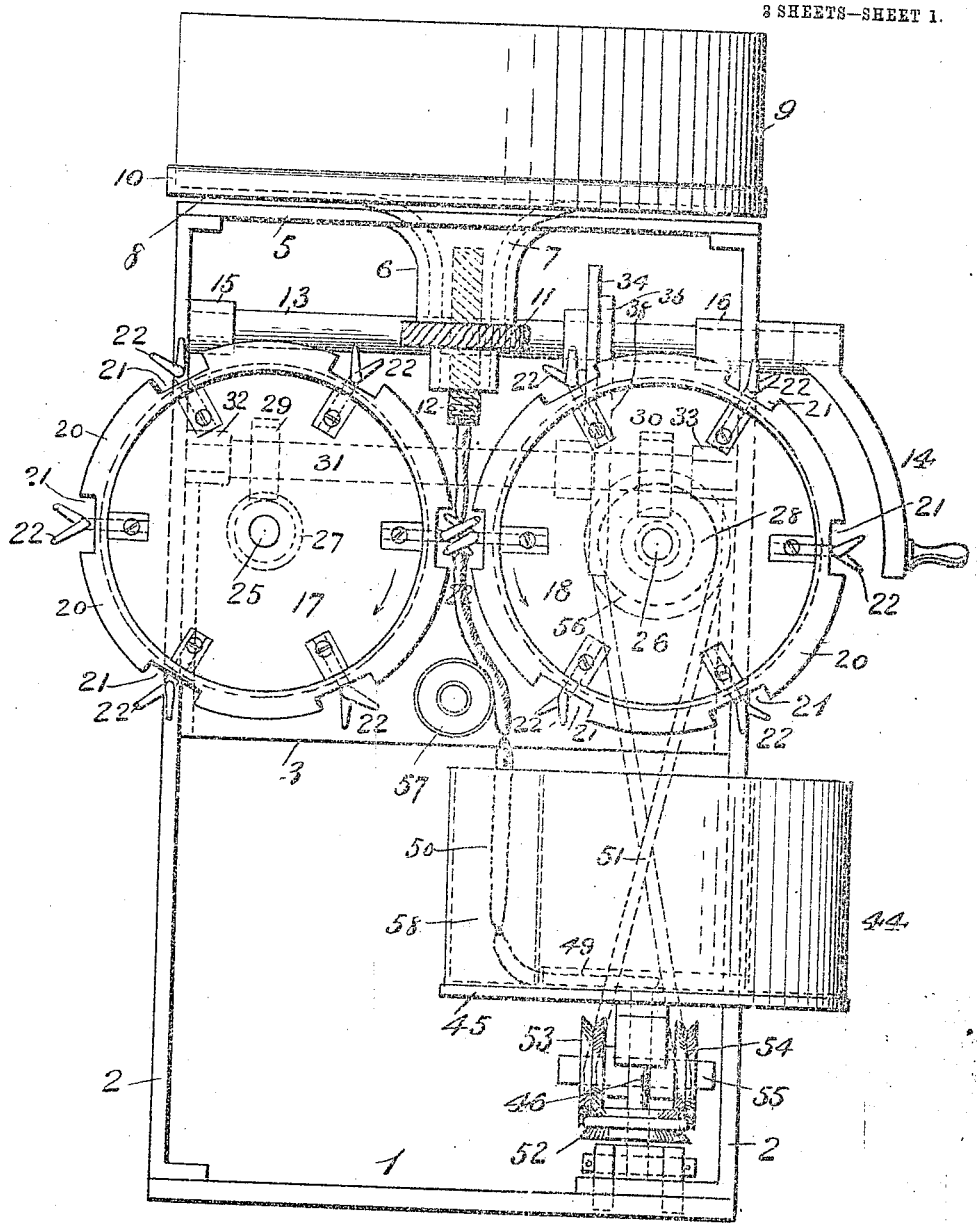
Figure 2:
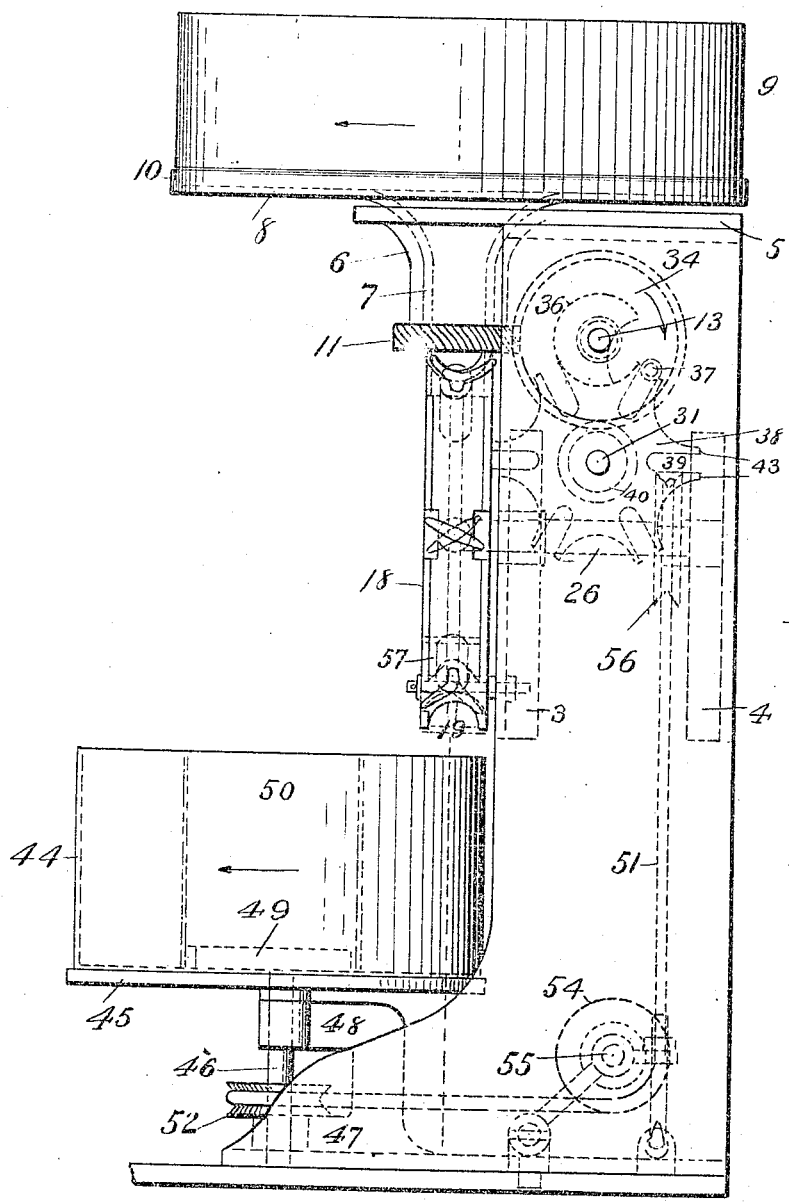

In the accompanying drawings, which form part of this specification:—Figure 1 represents a front elevation of a machine embodying my invention. Fig. 2 a side elevation of the same. Fig. 3 a plan view of the compression or linking forks detached, and on an enlarged scale. Fig. 4 an elevation of the intermittent gear for driving the link forming disks and the receiving receptacle, and, Fig. 5 an end view of the same.

Reference being had to the drawings and the designating characters thereon, 1 indicates the base plate or bottom of the frame of the machine, 2, 2, the sides, 3 the front, 4 the back plate of the frame, 5 the top plate, all of which parts are properly secured together by bolts, not shown. The top plate 5 is provided with a tubular projection 6 to receive a like extension 7 of the horizontal plate 8 which supports the sausage receptacle 9, and in which the filled sausage casings as they proceed from a stuffing or filling machine are coiled. The plate 8 is provided with a vertical and annular flange 10 for retaining the receptacle 9 in position, and within which it fits loosely, so that it can be readily put in position with its contained filled sausage-casings, and as readily removed when empty and to be replaced by another filled receptacle. The receptacle 9 is provided with an opening in the center of its bottom, not shown, through which the filled sausage-casings pass into the tubular extension 7 and on down to the sausage dividing or linking devices. On the extension 7 is secured a horizontal spur gear wheel 11, having spiral or helical teeth, which engages with a like gear wheel 12 on shaft 13 and is revolved by crank 14 or any preferred driving means, such as a pulley. The shaft 13 is supported in bearings 15, 16 on the frame.

17, 18 are opposite disks provided with a concave groove 19 in the periphery thereof to allow the passage of a sausage between the disks, and the rim 20 of the disks is provided with recesses 21 in which are compression or linking jaws or forks 22, which are shown integral with an arm 23 adjustably and detachably secured to the disks, they may however be cast integral with the rim of the disk. The recesses 21 are spaced apart, the length of the link of the sausage desired, and in the revolution of the disks 17, 18, the forks cross each other and compress the filling in the casing into a small neck, the dimensions of the opening 24 between forks, as shown in Fig. 3. The disks 17, 18 are supported respectively on shafts 25 and 26, on which are helical spur gear wheels 27 and 28, and the disks are revolved toward each other by a helical spur gear 29, engaging the helical spur gear 27 and a helical spur gear 30 engaging the helical spur gear 28, and the shaft 31 on which the gears 29 and 30 are secured, is supported in bearings 32 and 33. The spur gear wheels with spirally arranged or helical teeth are well known and require no further exemplification or illustration.

On the shaft 13 is secured a disk 34 having a hub 35 and a locking member 36, and a roller wrist or crank pin 37. On the shaft 31 is secured a plate 38 having a series of radial slots 39 corresponding with the number of recesses 21, in each disk 17, 18, and said slots are engaged by the pin 37 in the revolution of the disk 34 and impart intermittent motion to the disks 17, 18, and to the receptacle 44.

The plate 38, is provided with a hub 40, and in the ends of the arms between the slots 39, are concave seats 41 which engage the periphery of the member 36; and the member 36, is cut away at 42 to allow the points 43 of the arms to pass. During the time that the pin 37, travels from the slot 39, it is leaving, to engage the next slot 39 in rotation, the plate 38 is held stationary by its engagement with the member 36, thus imparting intermittent motion to the disks 17, 18, and the receptacle 44.

44 indicates an annular receptacle to receive the linked and twisted sausages as they proceed from the disks 17, 18. The receptacle rests upon a horizontal plate 45 having a vertical shaft 46 supported in a bracket 47 and its arm 48, and the receptacle is held in position on the plate 45, by a projection 49 thereon which extends into the concentric opening 50 of the receptacle. The receptacle 44, is made annular to cause the linked sausages to be deposited therein in coiled layers so that they may be readily removed from the receptacle and hung on a pole for curing. As one receptacle 44 is filled, it is removed and an empty one put in its place.

The receptacle 44 is revolved by a belt 51 engaging a pulley 52 on shaft 46, idler pulleys 53 and 54 on shaft 55, and pulley 56 on shaft 26, and the receptacle 44 has intermittent rotary motion imparted thereto in the same direction as the motion of the supply receptacle 9. The linked sausages are guided into the receptacle 44 by a roller 57 and fall into the annular chamber 58 of the receptacle. It is obvious that the receptacle 44 and its support may be dispensed with and the linked sausages deposited on the bottom plate of the machine or in a suitable receptacle resting on said plate, from which they may be removed by hand.

The operation of the machine is as follows: Filled casings or sausages coming from a stuffing machine are coiled in the receptacle 9, leaving the center open and placed on the plate 8, the loose end of the sausage is then passed down through the extension 7 of the plate 8 until it reaches forks 22, when the shaft 13 is revolved and a regular rotary motion is imparted to the receptacle 9. At the same time intermittent motion is imparted to the disks 17 and 18 carrying the arms 22. The rotary motion of the receptacle 9 twists the casing while held between the forks 22 of the opposite disks 17, 18, and the receptacle 44 is revolved intermittently in unison with the disks 17 and 18 to receive the linked sausages as they proceed from disks 17 and 18. It is obvious that continuous rotary motion may be imparted to the disks and the sausage receiving receptacle by substituting suitable gearing and connecting said parts with the shaft 13, and revolving the sausage supply receptacle at a higher rate of speed than the disks and the linked sausage receptacle to twist the neck between the links. The making of such changes in the gearing is the work of the skilled mechanic and requires no further elucidation.

Having thus fully described my invention, what I claim is

1. In a sausage linking and twisting machine, a sausage supply receptacle revoluble transversely to the line of feed of the sausages, means for linking sausages, means for imparting continuous rotary motion to said receptacle, and means for imparting rotary motion to the linking device.

2. In a sausage linking and twisting machine, a sausage supply receptacle revoluble transversely to the line of feed of the sausages, a linked sausage receptacle, means between said receptacles for linking sausages, means for imparting continuous rotary motion to the supply receptacle, and means for imparting rotary motion to the linking device and the latter receptacle.

3. In a sausage linking and twisting machine, a sausage supply receptacle, a revoluble support for said receptacle having a passage for sausages through the center thereof, disks provided with means for dividing the sausages into links, means for imparting continuous rotary motion to said receptacle, and means for imparting rotary motion to said disks.

4. In a sausage linking and twisting machine, a sausage supply receptacle, a revoluble support for said receptacle having a passage for sausages through the center thereof, a receptacle for linked sausages, a revoluble support for said receptacle, disks provided with means for dividing the sausages into links, means for imparting continuous rotary motion to the supply receptacle, and means for imparting rotary motion to said disks and the latter receptacle.

5. In a sausage linking and twisting machine, a sausage supply receptacle, a revoluble support for said receptacle having a tubular extension thereon forming a passage for sausages, opposite disks having recesses in the rims thereof, bifurcated members in said recesses for dividing the sausages into links and holding the joint between the links while they are being twisted, means for imparting continuous rotary motion to the supply receptacle, a linked sausage receptacle, and means for imparting rotary motion to the linking disks, and to the linked sausage receptacle.

6. In a sausage linking and twisting machine, a sausage supply receptacle, a horizontal revoluble support for said receptacle having a vertical tubular extension thereon forming a passage for sausages, a gear-wheel on said extension, a gear-wheel engaging the wheel on said extension, a power shaft supporting said gear-wheel, a pair of disks provided with means for dividing sausages into links, and means for imparting rotary motion to said disks.

7. In a sausage linking and twisting machine, a revoluble sausage supply receptacle, a pair of revoluble disks provided with means for dividing filled sausage casings into links, and a revoluble linked sausage receptacle, means for revolving the sausage supply receptacle, and means for revolving the linking disks and the linked sausage receptacle synchronously.

In testimony whereof I affix my signature, in presence of two witnesses.

HENRY W. LOUDEN, Sr.

Witnesses:
G. E. KUNEY,
E. T. LIGHT.